Aug. 24, 1926.
G. B. HUTCHINGS
1,597,316
METHOD OF AND APPARATUS FOR ATTENUATION
Original Filed Dec. 29, 1919   2 Sheets-Sheet 1
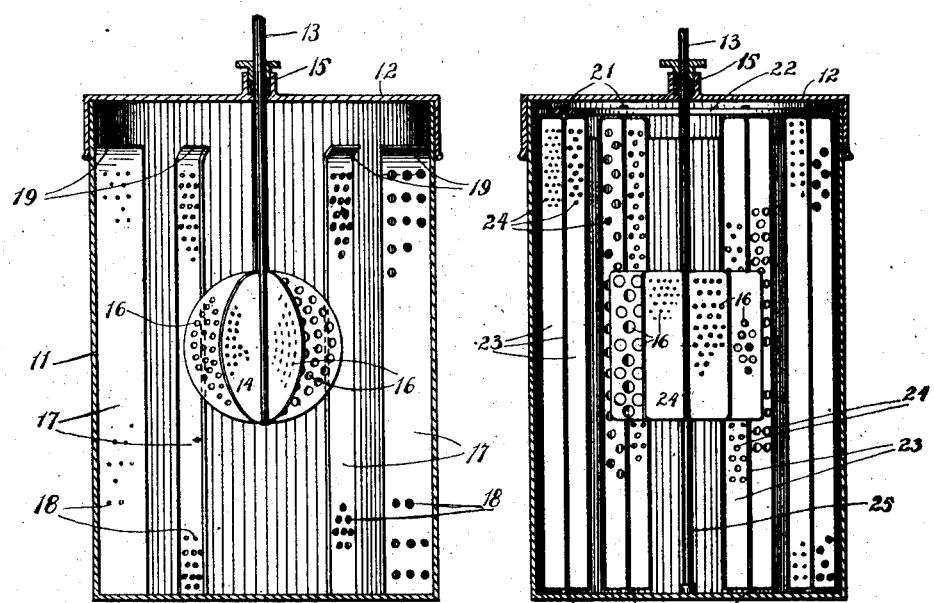
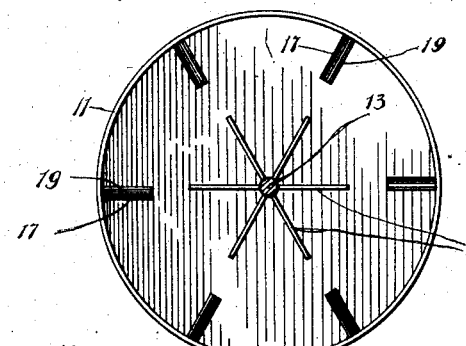
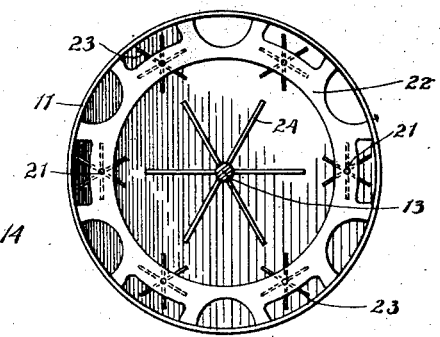
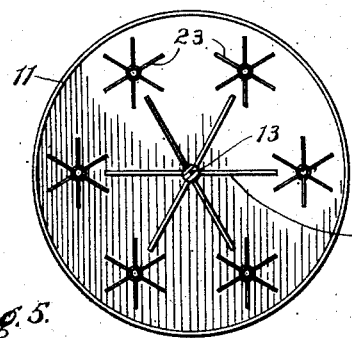
Inventor
George B. Hutchings
By his Attorney
Arthur Middleton Aug. 24, 1926.
G. B. HUTCHINGS
1,597,316
METHOD OF AND APPARATUS FOR ATTENUATION
Original Filed Dec. 29, 1919  2 Sheets-Sheet 2
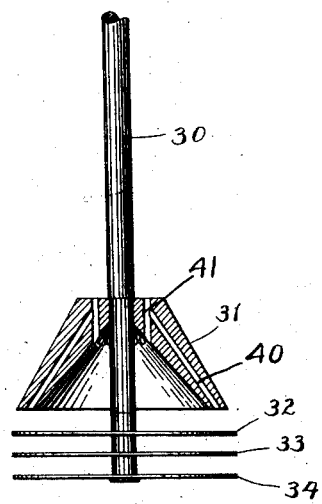
Fig. 10.
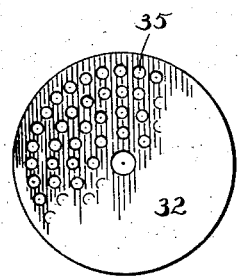 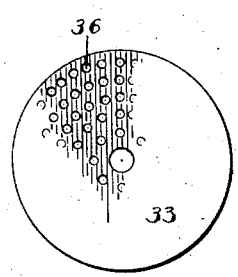 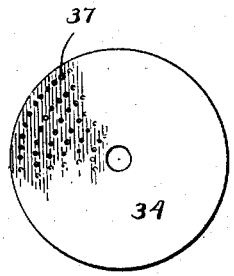
Fig. 11.  Fig. 12.  Fig. 13.
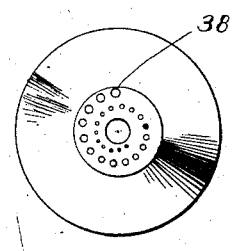
Fig. 14.
Inventor
George B. Hutchings
By his Attorney
Arthur Middleton Patented Aug. 24, 1926.

1,597,316

UNITED STATES PATENT OFFICE.

GEORGE B. HUTCHINGS, OF RICHMOND, VIRGINIA.

METHOD OF AND APPARATUS FOR ATTENUATION.

Application filed December 29, 1919, Serial No. 348,251. Renewed January 18, 1926.

This invention relates to the making of emulsions and its object is to provide a device which attenuates or homogenizes the particles of the products to be emulsified so that a stable or otherwise efficient emulsion results.

The invention is illustrated in the accompanying drawing in which—

Figure 1 is a vertical sectional view through one of my attenuaters or emulsifiers.

Fig. 2 is a plan view thereof with the top or cap removed.

Fig. 3 is a vertical sectional view through a more complex form of an attenuater.

Fig. 4 is a plan view thereof with the top removed.

Fig. 5 is a plan view of a further modified form with top removed.

Figs. 6 to 9 illustrate the principle on which the invention is based. Figs. 10 to 14 show modifications.

In the drawings, the numeral 11 indicates a cylindrical container having a cap or top 12 which is made removable to permit filling of the container with the ingredients to be emulsified. Through the cap 12 passes a driving shaft 13 carrying an agitating or stirring element 14. 15 represents a gland to prevent the contents of the container from leaking out.

The agitator 14 is composed of a series of blades formed by intersecting planes, either round as shown in Fig. 1 or squared as in Fig. 3, having perforations 16 therein, the perforations in each subsequent blade of the agitator being smaller than those of the preceding one. Fins or deflectors 17 project radially from the inner wall of the container which are perforated at 18 with different sized perforations in different fins, in the same manner as in the blades of the agitator. The tops 19 of the fins 17 are slightly curved.

In operation, the ingredients to be emulsified are placed in the container, the top put in place, and the agitator rotated at great speed. This causes active rotation of the liquid in the container and the momentum it gathers plus centrifugal force, impacts the liquid against the fins 17. The particles of the liquid are initially in the approximate form shown in Fig. 6. After impact with the blade and/or fin having the largest perforations, the particles are elongated into the shape shown in Fig. 7. Impact with and passage through the next smaller perforations, further elongate the particles into the form shown in Fig. 8, and impact with and passage through the next smaller perforations cause further elongation and breaking up of the particles as shown in Fig. 9. In these steps "attenuation" is brought about which for the purpose of this patent may be defined—the elongation or thinning of the particles and their breaking up into smaller particles. Another term,—homogenation—may be used instead of attenuation to express the same idea. As the finer or smaller or more minute the particles of an emulsion are made, the more stable it is, so it can be seen that this is a very efficient apparatus.

In the form shown in Figs. 3 and 4, the fixed fins 17 of Fig. 1 are replaced by rotatable agitators pivoted at 20 in the bottom of the container and at 21 at the top of the container in a suitable ring 22. The blades 23 of the agitators have perforations 24 therein varying in size on each blade 23 as described for the agitator 14 and fins 17. In this case the main agitator 24 is shown as squared and supplied with an extension 25 on the shaft 13 for steadying it. This extension could be used in the form shown in Fig. 1 if desired.

In operation, this form is the same as that of the device of Fig. 1, except that impact of the liquid against the rotators 23 cause them to rotate which seems to more effectively attenuate the particles than the stationary fins of Fig. 1.

The modification shown in Fig. 5 is the same as that shown in Fig. 3 except the rotators 23 are set closer to the blades of the main agitator 14 so that the rotators 23 are positively rotated by the agitator 14 but in a direction opposite thereto. For some ingredients, this form seems to be more efficient than the others shown. In the embodiment shown in Figs. 10 to 13, the numeral 30 represents the rotatable stem and 31 represents the agitator button covered by my application Serial Number 340,225 filed Nov. 24, 1919 but in this form, the stem or rod 30 passes therethrough and below the button 31 carries one or more discs 32, 33 and 34. Disc 32 has perforations 35 therein, disc 33 has perforations 36 smaller than perforations 35, and disc 34 has perforations 37 smaller than perforations 36. The button 31 is provided with forked ducts each of which have a long fork or leg 40 and a short fork or leg 41 with the one fork entering the other fork intermediate of its length so that a Y-shaped or bent duct is formed through which the particles to be acted upon are adapted to be forced. In operation these perforations successively decreasing in size are effective to attenuate the particles of the materials to be emulsified.

In the form shown in Fig. 14 a plan view is shown of the button of my former application above referred to, but instead of having the perforations extending therethrough uniform in size, I make, in this case, perforations 38 successively smaller in size and spirally arranged as shown for the purpose of more effectively attenuating the particles of the emulsifiable materials. The devices of Figs. 10 to 14 may be used with or without a finned container.

This invention contemplates the extreme attenuation of the particles of the materials to be emulsified by means of causing them to pass through a perforated element, whose perforations successively decrease in size, by pressure created centrifugally and it is this invention that I mean this patent to cover and protect so that the embodiments shown are to be taken purely in an illustrative sense instead of a limiting one.

What I claim is:—

1. In combination with an apertured emulsifying button device, a plurality of discs therebelow, said discs having perforations therein.

2. The apparatus of claim 1 in which the perforations of successive discs are progressively different in relative size.

3. In combination, a stem, an apertured emulsifying button device on said stem and a plurality of apertured discs on said stem below said button device.

4. An emulsifying rotating button device having apertures extending substantially longitudinally therethrough, said apertures having progressively different relative sizes.

5. An emulsifying element substantially a truncated cone in shape having a plurality of forked ducts therein, each forked duct having two legs with one leg opening into the other leg intermediate of its length.

In testimony whereof, I have signed my name to this specification, this 28th day of November, 1919.

GEORGE B. HUTCHINGS.